United States Patent Office 3,025,314
Patented Mar. 13, 1962

3,025,314
RECOVERY OF OIL FROM ACETONE-HEXANE-WATER MIXED SOLVENT EXTRACTS OF RAW COTTONSEED MEATS
William H. King and Vernon L. Frampton, Metairie, La., assignors to the United States of America as represented by the Secretary of Agriculture
No Drawing. Filed Aug. 8, 1960, Ser. No. 48,336
5 Claims. (Cl. 260—412.4)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to a process for recovering cottonseed oil from a mixed miscella (solution of oil in solvent) consisting of acetone-hexane-water solvent mixture solutions of cottonseed oil such as are obtained by extraction of raw cottonseed meats by the procedures described in copending application Serial No. 843,312, filed September 29, 1959, now U.S. Patent No. 2,950,198. The term "hexane" as used herein refers to a petroleum ether fraction boiling in the range 62–78° C.—commonly known in the vegetable oil extraction industry as commercial hexane.

In the extraction procedure of the above-referenced copending application uncooked, decorticated, flaked cottonseed meats are extracted with a mixture of acetone, hexane, and water in the proportions 53–44–3% by volume, respectively, to remove crude cottonseed oil and pigments from the cottonseed meats to produce a meal of superior nutritional properties. In that procedure the crude oil and solvent are separated by simple continuous distillation in a primary evaporator, such as is used in commercial vegetable oil extraction plants to recover commercial hexane from hexane-oil miscellas. The above described solvent mixture is easily recovered by distillation. However, complete recovery of solvent and stripping of the oil requires the use of elevated temperatures (up to 100° C.). Subjecting cottonseed oil to elevated temperatures in the presence of large quantities of the pigment gossypol, such as are extracted from the raw seed by the procedure described, causes a fixation of red color in the oil which is very difficult to remove by the usual vegetable oil refining procedures.

It has been discovered by the applicants that the crude oil and solvent can be separated by the procedures described hereinafter in the instant application at low temperatures or without the application of any heat prior to separation of the oil from the deleterious pigments.

Another objective of the invention is the recovery of acetone from the miscella so that it may be reused for extraction of additional batches of raw cottonseed meats. An extensive study by the applicants of record into the physical properties of acetone-hexane-water mixed solvent has shown that upon fractional distillation of such mixtures, using an efficient fractionating column, an azeotropic mixture of acetone, hexane, and water in the relative proportions of 45–53.5–1.5% by volume, respectively, distills in the beginning at a temperature of 50° C. until all of the hexane is distilled. Subsequently the remainder of the acetone, and finally water are distilled within a temperature range of 56 to 100° C. In the course of this study it was discovered that when mixtures of acetone, hexane, and water are distilled continuously with an excess of either water and/or hexane, a solvent mixture, consisting of acetone, hexane and water, distills over at a temperature range of 45 to 52° C., leaving behind excess water or hexane, or both depending on the mixture being distilled. The same phenomenon occurs also when cottonseed oil is present. This discovery of the physical behavior of acetone, hexane, and water mixtures on continuous distillation provides the basis for separation of the extraction solvent mixture and the oil, as described herein.

The amount of water and the amount of hexane added as excess (excess with respect to the water and the hexane present in the original A.H.W. mixture) prior to the distillation which results in a separation of the water and hexane phases is widely variable. The amount of hexane added, for example, depends upon the operators' choice of hexane-oil concentration desirable for final removal of oil by the stripping of hexane. Oil rich miscellas become difficult to transfer by pumping and very dilute miscellas are uneconomical. The amount of water added as excess is likewise variable and ideally would be just the amount of water required, in addition to the water present in the original A.H.W. mixture, to carry in solution the gums and water soluble constituents of the oil at such time as the water and the hexane phases separate (i.e., when all of the acetone has been removed by distillation).

When the oil-acetone-hexane-water mixed solvent miscella is continuously distilled in the presence of an added excess of both water and hexane the solvent mixture is recovered until a temperature of 60° C. is reached at which time the mixture remaining in the still pot consists of a hexane solution of the oil—in one layer—and an aqueous phase consisting of an aqueous dispersion of gums—neither of which contain acetone, which was completely removed in the constant boiling mixture which distilled initially. Thus the crude oil is obtained in this instance as an oil-hexane miscella which, after simple mechanical separation from the lower aqueous layer, may, if desired, be subjected to an aqueous alkaline wash to remove gossypol and related pigments without interference from the presence of a mutual solvent such as acetone which has been removed by azeotropic distillation. The other two products of the distillation are (1) recovered acetone-hexane-water mixed solvent suitable for reuse and (2) a product consisting of water and suspended gums, such as are usually removed from cottonseed oil upon refining by present commercial procedures.

Another method of accomplishing the separation of oil from the mixed solvent miscella was also discovered. The acetone is extracted from the oil-solvent miscella countercurrently with water. This provides an aqueous solution of acetone containing suspended and dissolved gums and an oil-hexane miscella, free from acetone, which may then be given an alkaline wash to remove the deleterious gossypol pigments after which the oil may be recovered by the usual commercial procedures from the oil-hexane miscella. The aqueous solution of acetone and gums and the hexane recovered by usual stripping procedures from the oil-hexane miscella may then be concurrently introduced into the solvent recovery still, along with extra added water, if desired, and the original solvent mixture may be recovered in an essentially unchanged form by simple distillation of the constant boiling mixture—leaving water and gum suspension behind in the still for disposal as waste or for further processing to recover the gums if desired.

The principal advantages of the recovery processes described herein are (1) the recovery of the original solvent mixture for reuse and (2) conversion of the crude oil to a hexane-oil miscella, free from acetone, so that the crude oil-hexane miscella can be subjected to an aqueous, alkaline wash to remove gossypol before recovering the gossypol-free oil from the oil-hexane miscella by usual commercial procedures. Essentially gossypol-free oil is thus obtained, with the application of little or no heat while gossypol is present, so that it may be stored prior to further refining without suffering color reversion due to the presence of gossypol. It is a well known fact in the cottonseed oil extraction industry that to heat crude oil containing gossypol extensively, or, to store it prior to refining it, will cause serious color reversion of the oil due to the action of the gossypol so that the oil is very difficult or impossible to refine to a satisfactory color.

Another advantage of the present invention is the conversion of the crude oil from an acetone-hexane-water solution to a hexane solution of the crude oil so that it may be completely refined in the miscella phase, if desired.

Another advantage of the invention lies in the ease of recovery of solvent in the steam stripping, or sparging, to remove the last traces of solvent from the oil. When acetone is present in the solvent it is soluble in condensed steam and cannot be recovered by simple skimming as is the case in the recovery of hexane stripped from oil obtained from oil-hexane miscella by present commercial solvent extraction processes. Conversion of the miscella to oil-hexane miscella by removal of acetone from the original oil-A.H.W. miscella obviates this difficulty since only hexane need be stripped from the desolventized oil and this can be done by the usual procedures which are presently used commercially. In the present case this can be done after removal of deleterious pigments before application of heat in the stripping procedure.

The following examples are illustrative of the details of at least one method of practicing the invention.

*Example 1*

An oil-mixed solvent miscella (approximately 4% by weight of oil) was obtained by complete extraction of raw, flaked cottonseed meats with a solvent mixture consisting of 53 parts of acetone, 44 parts of hexane, and 3 parts of water by volume. One hundred parts of this miscella was extracted with 6 successive portions of 10 parts of water each to remove acetone and gums, leaving as the upper layer of the two liquid phase extraction a crude oil-hexane miscella, free from acetone and water. The resulting miscella was then well mixed with one portion consisting of 5 parts by volume of 10% w./v. NaOH. The mixture was allowed to stand for 30 minutes until the emulsion broke and the lower aqueous layer of sodium hydroxide containing free fatty acids and gossypol and related pigments was separated from the upper layer consisting of a solution of refined cottonseed oil dissolved in hexane. The hexane was removed from the refined oil-miscella by distillation. The resultant refined oil residue was then filtered. Examination showed it to have the refined color of prime summer refined cottonseed oil. The refined oil was then bleached by heating to 120° C. over a period of 5 minutes with stirring in the presence of 4 percent of standard bleaching earth according to the official A.O.C.S. method. The resultant bleached cottonseed oil had a color of 2.5 A.O.C.S. units or less, showing that the refined oil obtained as above is of prime bleachable summer yellow cottonseed oil quality, or better.

For recovery of the original A.H.W. solvent mixture the hexane recovered from the oil-hexane miscella as described above was fed concurrently and continuously with the aqueous washings obtained by the procedure described above into a rising film evaporator heated by a steam jacket to a temperature of not more than 100° C. Continuous and complete recovery of the original acetone-hexane-water mixture was thus effected. The residue in the still consisted of the water added in the above described extraction operation, used for the removal of acetone from the original oil acetone-hexane-water miscella, the water containing gums removed during washing of the miscella with water.

*Example 2*

An oil-mixed solvent miscella (approximately 4% by weight of oil) was obtained by complete extraction of raw, flaked cottonseed meats with a solvent mixture consisting of 53 parts of acetone, 44 parts of hexane, and 3 parts of water, by volume. After adding 40 parts by volume of hexane and 10 parts of water to a rising film evaporator, 100 parts of the above miscella was fed slowly and continuously to the evaporator with application of heat at such a rate that the acetone-hexane-water mixture distilled over a vapor temperature not exceeding 60° C. After complete recovery of the acetone-hexane-water mixture by distillation the residue in the evaporator consisted of a hexane solution of oil and an aqueous layer of water and gums extracted from the crude oil by the water layer. The two layers were separated and the oil-hexane miscella was mixed with one portion consisting of 5 parts by volume of 20% aqueous NaOH solution. The mixture was allowed to stand until the emulsion broke and the oil-hexane miscella was then separated from the foots and filtered. The hexane which had been placed in the evaporator initially was recovered from the oil by distillation. The solvent-free oil thus recovered was bleached with standard bleaching earth by the standard A.O.C.S. method. The color of the bleached oil was 1.0 A.O.C.S. unit, showing that the oil recovered by the above procedure is readily bleachable.

We claim:

1. A process comprising extracting raw, decorticated, and flaked cottonseed meats containing cottonseed oil, undesirable pigments including gossypol, and water-dispersible gums with a homogeneous, constant boiling mixture consisting of 53 parts by volume of acetone, 44 parts by volume of hexane, and 3 parts by volume of water to obtain a cottonseed meal and a miscella containing the cottonseed oil, the undesirable pigments, the gums, acetone, hexane, and water, mixing with said miscella a member selected from the group consisting of hexane, water, and mixtures thereof, heating the resulting mixture at a temperature not exceeding about 60° C. until all the acetone has been removed by azeotropic distillation to produce a two-layer system in which one of the layers comprises a hexane solution of the cottonseed oil and the pigments and the other layer comprises an aqueous dispersion of the gums, separating the hexane layer from the aqueous layer, subjecting the hexane layer to an alkaline wash to remove the pigments therefrom thereby obtaining a hexane solution of the cottonseed oil, and isolating the cottonseed oil from the hexane to obtain a refined cottonseed oil.

2. A process comprising extracting raw, decorticated, and flaked cottonseed meats containing cottonseed oil, undesirable pigments including gossypol, and water-dispersible gums with a homogeneous, constant boiling mixture consisting of 53 parts by volume of acetone, 44 parts by volume of hexane, and 3 parts by volume of water to obtain a cottonseed meal and a miscella containing the cottonseed oil, the undesirable pigments, the gums, acetone, hexane, and water, extracting the miscella with water to produce a two-layer system in which one of the layers comprises a hexane solution of the cottonseed oil and the pigments and the other layer comprises an aqueous dispersion of the gums and dissolved acetone, separating the hexane layer from the aqueous layer, subjecting the hexane layer to an alkaline wash to remove the pigments therefrom thereby obtaining a hexane solution of the cottonseed oil, and isolating the cottonseed oil from the hexane to obtain a refined cottonseed oil.

3. The process of claim 2 wherein the layer comprising an aqueous dispersion of the gums and dissolved acetone is combined with the hexane isolated from the hexane solution of the cottonseed oil and the resulting mixture distilled to recover the original homogeneous, constant boiling mixture of acetone, hexane, and water in essentially unchanged form as distillate.

4. The process of claim 1 wherein the member mixed with the miscella is a mixture of hexane and water in the proportion of about 40 parts by volume of hexane and about 10 parts by volume of water per 100 parts by volume of the miscella.

5. The process of claim 2 wherein the miscella is extracted with water in the proportion of about 10 parts by volume of water per 100 parts by volume of the miscella.

References Cited in the file of this patent

UNITED STATES PATENTS 2,786,858　　Vandervoort　----------　Mar. 26, 1957